United States Patent [19]

Nichols et al.

[11] Patent Number: 4,911,201

[45] Date of Patent: Mar. 27, 1990

[54] VALVED MANIFOLD

[75] Inventors: Joseph H. Nichols, San Luis Obispo; Michael E. Jones; Ronald G. Hendry, both of Los Osos, all of Calif.; Charles M. Obermeyer, Littleton, Colo.

[73] Assignee: Cryoloab, Inc., San Luis Obispo, Calif.

[21] Appl. No.: 336,863

[22] Filed: Apr. 12, 1989

[51] Int. Cl.⁴ .............................................. F16K 51/00
[52] U.S. Cl. ................................. 137/561 A; 137/883
[58] Field of Search ............................. 137/883, 561 A

[56] References Cited

U.S. PATENT DOCUMENTS 2,598,961  6/1952  Andrus ................................. 137/883

Primary Examiner—John Rivell
Assistant Examiner—Leonard R. Leo
Attorney, Agent, or Firm—Daniel C. McKown

[57] ABSTRACT

A unitary block of steel is formed into a manifold by a feeder bore that is intersected by one or more common branch bores. The common brach bore includes a first branch and a second branch which extend along the common branch bore axis in opposite directions from the feeder bore. The first branch is intersected by a first stem cavity and the second branch is intersected by a second stem cavity, and the valve stems are located in these cavities. In this way, the manifold block is formed by boring operations instead of by casting, the flow of gas through the branches is unimpeded by obstructions or offsets in the flow path.

2 Claims, 2 Drawing Sheets

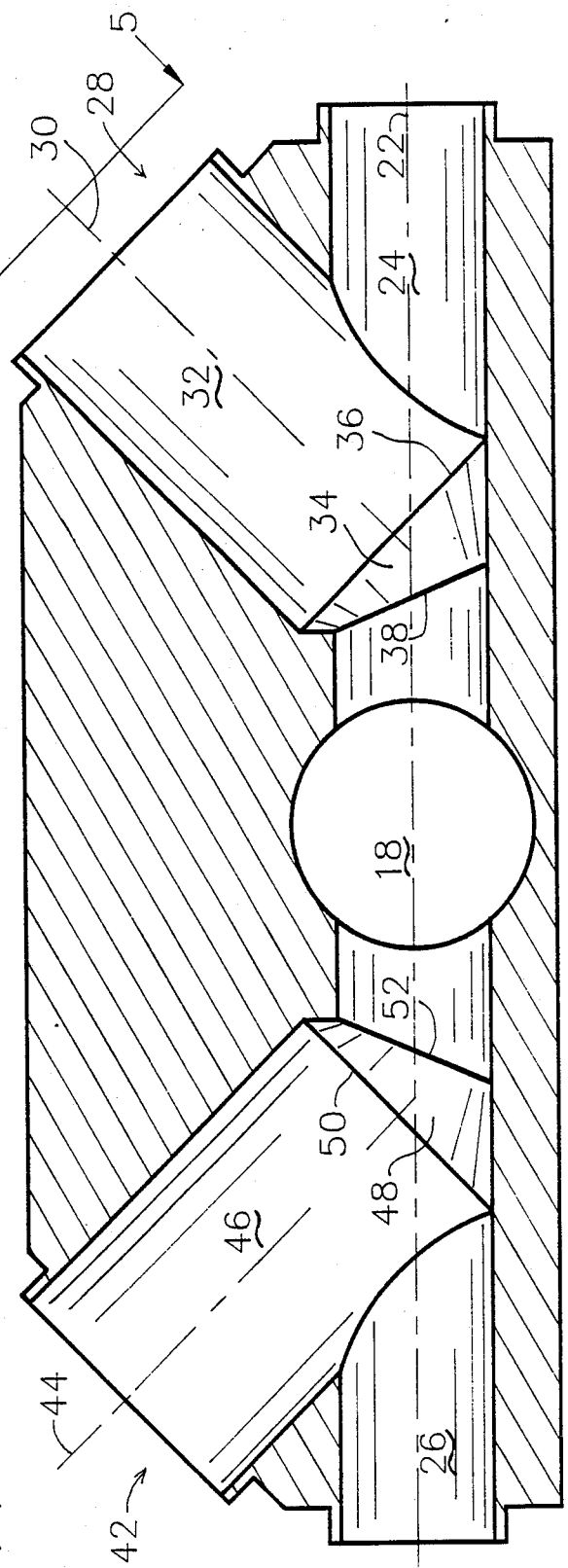
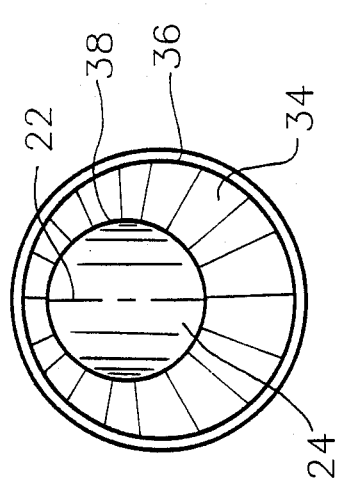
FIG. 4
FIG. 5

4,911,201

VALVED MANIFOLD

FIELD OF THE INVENTION

The present invention is in the field of valves and more particularly relates to the structure of a valved manifold formed in a unitary block of metal by boring operations only. The structure incorporates in each branch an ultra-high purity gas valve or a type used in the semiconductor industry.

THE PRIOR ART

FIG. 1 shows a typical Y-valve of the prior art. Note that the valve seat partially obstructs the flow path. In other prior art valves, provision for the valve seat necessitates offsetting the output bore from the input bore.

Such offsets and obstructions create regions of turbulent flow which lower the flow coefficient through the valve. The offsets and obstructions also give rise to stagnant regions, which are undesirable when the valve is handling aggressive or corrosive gases.

In addition to obstructing the flow, the offsets and obstructions inherent in most types of prior art valves make it difficult, if not impossible, to form in a unitary block of metal the several valve bodies required for a manifold. At a minimum, a complex casting would probably be required.

In ultra-high purity valves, the internal surfaces need to be polished to mirror-like perfection. This polishing operation is made much more difficult by the presence of obstructions and oddly-shaped surfaces.

Thus, most types of valves known in the prior art are inappropriate and undesirable for use in a block manifold where a number of valve bodies must be formed in a unitary block of metal.

In a technical paper entitled "Development of Contamination-free Gas Components and Ultra Clean Gas Supply System for ULSI Manufacturing" and published in 9th ICCCE Proceedings 1988, Institute of Environmental Sciences, Kanno and Ohmi report the development of a block manifold using diaphragm valves. However, in these valves, no straight unobstructed bore exists between the inlet port and the outlet port, whereby some of the advantages of the present invention are lost.

SUMMARY OF THE INVENTION

The most distinctive feature of the manifold of the present invention is that a straight unobstructed bore extends from the inlet port to the outlet port of each valve and defines the flow path through the valve when the valve is fully open. This permits the manifold to be formed from a unitary block of metal by boring (and polishing) operations only. No complicated casting is required.

The individual valves used in the present invention eliminate the offsets and obstructions heretofore found in Y-pattern valves and thereby result in improved flow characteristics. Compared to the type of prior art valve shown in FIG. 1, the Y-pattern valve used in the manifold of the present invention has a flow coefficient approximately 1.8 to 2.5 times as great.

In addition, the unobstructed bore structure of these valves permits solid objects to be passed freely through the bore of the valve, e.g., for preliminary polishing during manufacturing.

The individual valves used in the valved manifold of the present invention have the same design as the Ultra-high Purity Straight Bore gas valves that have been sold by Cryolab, Inc., of San Luis Obispo, Calif. (the original assignee of the present invention) for several years. This valve is the subject of U.S. Design Pat. No. 301,916 issued June 27, 1989 for ULTRA-HIGH PURITY GAS VALVE WITH STRAIGHT BORE. Although the valve design is thus not the invention claimed herein, the recognition of the advantages of such valves for use in a valved manifold and the unitary block manifold construction enabled by the use of such valves are considered to be patentable advances beyond the basic valve design.

FIG. 4 shows the various bores that are made in the formation of each of the valves used in the valved manifold of the present invention. The valve body is formed of a block of rigid material, preferably type 316L stainless steel.

The stem cavity is a shaped bore consisting of a cylindrical bore having a truncated conical extension at its deepest end, this extension being terminated by a surface that is generally transverse to the stem cavity axis and that forms the bottom of the stem bore.

A second bore, which is the flow path, is of cylindrical shape and extends entirely through the block, passing through the transverse surface at the bottom of the stem cavity, but not intersecting the truncated conical portion which serves as the valve seat.

In accordance with a preferred embodiment of the present invention, a feeder bore is drilled in a solid block of type 316L stainless steel. Branch bores are then produced which pass through the feeder bore and through the block to form two branches extending in opposite directions from the feeder bore. If only a single branch is desired, the branch bore can terminate at the feeder bore. These bores are shown in FIG. 3.

Stem bores are then made into the block, intersecting the branches in which valves are to be formed. Each stem bore includes a truncated conical portion that serves as the valve seat.

In this way, the entire manifold block is formed by boring operations, and it defines the valve bodies of the several valves as well as the feeder and branch lines.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 4 is an elevational view in the direction 4—4 indicated in FIG. 2; and,

FIG. 5 is an oblique view in the direction 5—5 indicated in FIG. 4.

DETAILED DESCRIPTION OF THE PREFERRED EMBODIMENT

Figure 1:
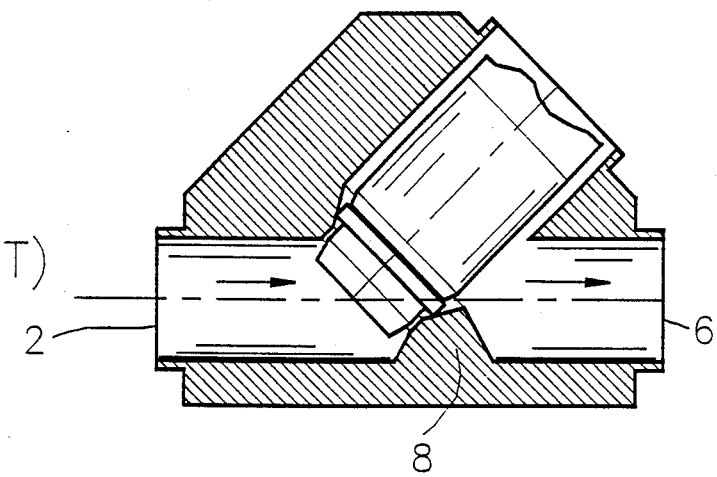
FIG. 1 is a diagram showing a cross-section through a Y-type valve of the prior art.

FIG. 1 is a simplified diagram showing a typical Y-type valve of the prior art. It includes an inlet port 2, an outlet port 6 and an obstruction 8 which consists of a portion of the valve seat. As described above, the obstruction 8 is definitely disadvantageous, both because of its effect on the flow through the valve, as well as because of the difficulties it causes in the manufacturing process.

Figure 2:
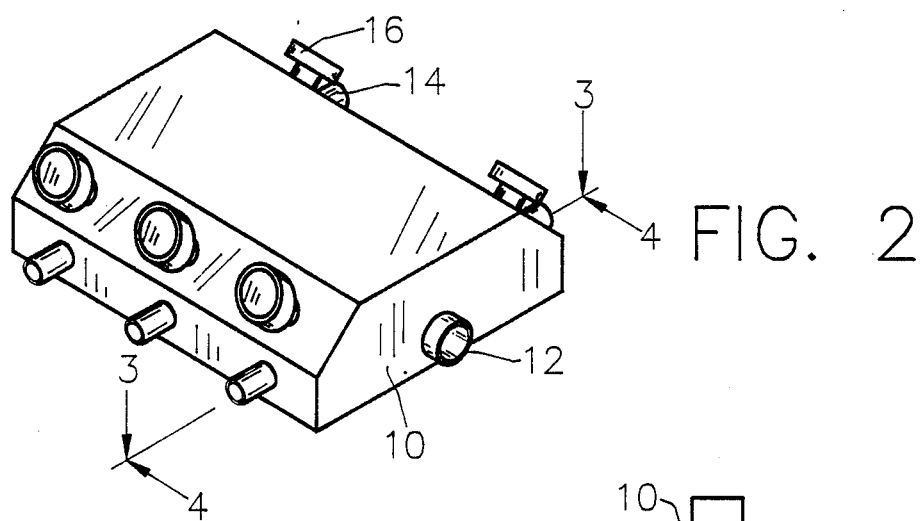
FIG. 2 is a perspective view showing a block manifold valve of the present invention.
Figure 3:
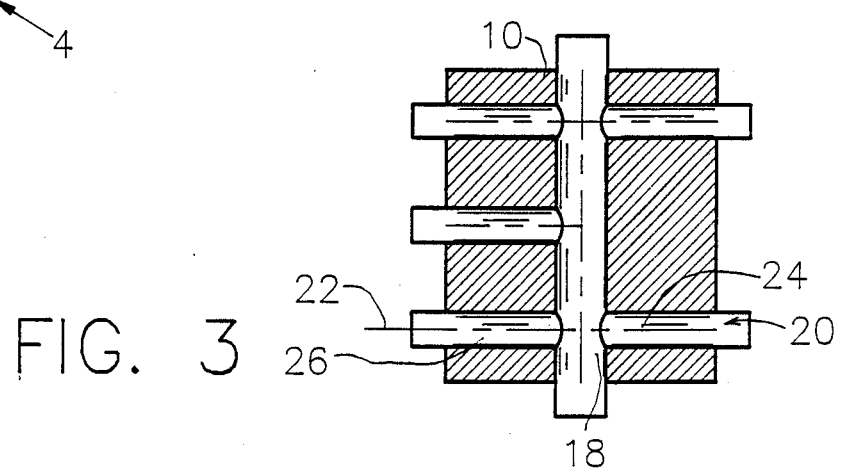
FIG. 3 is a cross-sectional plan view in the direction 3—3 indicated in FIG. 2.

These problems of the prior art valve of FIG. 1 are overcome by the type of valve construction shown in FIGS. 4 and 5, which makes practical the block manifold shown in FIGS. 2 and 3.

FIG. 2 is a perspective view showing a block manifold valve in accordance with a preferred embodiment of the present invention. The valve body is a unitary block 10 of type 316L stainless steel. A feeder tube 12 has been butt welded to the block 10, as have the branch tubes, of which the tube 14 is typical. Flow through a particular branch tube 14 is controlled by an associated valve handle 16. FIG. 2 shows the valve manifold in the form in which it is normally supplied to the customer, and in that form, the feeder tube 12 and the branch tubes 14 are usually in place. However, the feeder tube 12 and the branch tubes 14 are not a part of the present invention, which deals only with the shape of the block 10.

A feeder bore 18 is drilled through the block 10, and a common branch bore 20 is then drilled along a common branch bore axis 22 to intersect the feeder bore 18. In this way a first branch 24 and a second branch 26 are formed by a single drilling operation, and the first branch 24 and second branch 26 extend in opposite directions from the feeder bore 18.

Referring now to FIG. 4, a first stem cavity 28 is formed next; it is a figure of revolution about the first stem cavity axis 30. The first stem cavity includes a first cylindrical bore 32 and a first truncated conical extension 34 that has an open larger end 36 abutting the first cylindrical bore 32, that has a tangible conical surface, and that has an open smaller end 38.

FIGS. 2 and 4 show a preferred embodiment of the invention in which the first branch 24 occupies the entire area of the smaller end 38 of the first truncated conical extension 34. In other embodiments, the smaller end 38 is spanned by a tangible surface (which may be plane or arched) through which the first branch 24 passes, but in these other embodiments the first branch 24 does not occupy the entire area of the spanning surface, a part of which remains tangible.

Returning to FIG. 4, it is not necessary that the second stem cavity 42 be located the same distance from the feeder bore 18 as the first stem cavity 28. The second stem cavity is a figure of revolution about the second stem cavity axis 44. The second stem cavity includes a second cylindrical bore 46 and a second truncated conical extension 48 that has an open larger end 50 abutting the second cylindrical bore 46, that has a tangible conical surface, and that has an open smaller end 52.

In a more general embodiment, the smaller end 52 is spanned by a tangible surface that is pierced by the second branch 26, leaving part of the spanning surface intact and hence tangible. However, in the preferred embodiment of FIG. 4, the entire spanning surface is removed by the boring of the second branch 26.

In accordance with the present invention, the branches 24, 26 always pass through both the smaller ends 38, 52 and the larger ends 36, 50 of their respective truncated conical extensions 34, 49. The common branch bore 20 extends entirely through the block 10, straight and unobstructed.

Thus, there has been described a manifold block that serves as a body for a number of individual valves and that provides an unobstructed flow path through each valve. The manifold block of the present invention has the advantage of being relatively easy to form and the bores may easily be polished. In the preferred embodiment, a common branch bore intersects a feeder bore so as to form a first branch and a second branch that extend in opposite directions from the feeder bore along a common branch bore axis. Both the first branch and the second branch include valves for controlling the flow therein.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A valved manifold comprising:
   a block;
   a feeder bore extending into said block;
   a common branch bore passing straight and unobstructed through said block, passing through said feeder bore and including first and second branches extending from said feeder bore in opposite first and second directions along a common branch bore axis;
   a first stem cavity intersecting said first branch, having a first stem cavity axis that intersects the common branch bore axis, and including:
      a first cylindrical bore extending into said block and coaxial with said first stem cavity axis;
      a first truncated conical extension of said first cylindrical bore, coaxial with said first stem cavity axis, having a larger end abutting said first cylindrical bore and having a smaller end;
   said first branch passing through both the larger end and the smaller end of said first truncated conical extension;
   a second stem cavity intersecting said second branch, having a second stem cavity axis that intersects the common branch bore axis, and including:
      a second cylindrical bore extending into said block and coaxial with said second stem cavity axis;
      a second truncated conical extension of said second cylindrical bore, coaxial with said second stem cavity axis, having a larger end abutting said second cylindrical bore and having a smaller end;
   said second branch passing through both the larger end and the smaller end of said second truncated conical extension.

2. A valved manifold comprising:
   a block;
   a feeder bore extending into said block;
   a branch bore passing straight and unobstructed along a branch bore axis into said block and intersecting said feeder bore;

a stem cavity intersecting said branch bore, having a stem cavity axis that intersects the branch bore axis, and including:
 a cylindrical bore extending into said block and coaxial with said stem cavity axis;
 a truncated conical extension of said cylindrical bore, coaxial with the stem cavity axis, having a larger end abutting said cylindrical bore and having a smaller end;
said branch bore passing through both the larger end and the smaller end of said truncated conical extension.

* * * * *